(12) United States Patent
Waldern et al.

(10) Patent No.: US 6,175,431 B1
(45) Date of Patent: Jan. 16, 2001

(54) PROJECTION SYSTEMS BASED ON RECONFIGURABLE HOLOGRAPHIC OPTICS

(75) Inventors: Jonathan D. Waldern, Los Altos, CA (US); Milan M. Popovich, Leicester; John J. Storey, Wollaton, both of (GB)

(73) Assignee: DigiLens, Inc., Sunnyvale, CA (US)

( * ) Notice: Under 35 U.S.C. 154(b), the term of this patent shall be extended for 0 days.

(21) Appl. No.: 09/351,412

(22) Filed: Jul. 9, 1999

Related U.S. Application Data

(60) Provisional application No. 60/092,259, filed on Jul. 10, 1998.

(51) Int. Cl.[7] .............................. G02B 5/18; G02B 5/32; G03H 1/22; G02F 1/1335
(52) U.S. Cl. .................................. 359/15; 359/4; 359/22; 359/33; 359/576; 349/5; 349/201; 353/49
(58) Field of Search .............................. 359/3, 7, 32, 33, 359/15, 16, 19, 20, 576, 4, 22, 23, 24; 349/201, 5, 6, 7, 8, 106; 353/49

(56) References Cited

U.S. PATENT DOCUMENTS

| | | |
|---|---|---|
| 4,372,639 | 2/1983 | Johnson ................................. 350/3.7 |
| 4,799,739 | 1/1989 | Newswanger .......................... 350/3.7 |
| 5,046,793 | 9/1991 | Hockley et al. ......................... 359/12 |
| 5,111,313 | 5/1992 | Shires ..................................... 359/17 |
| 5,521,724 | 5/1996 | Shires ..................................... 359/22 |
| 5,698,343 | 12/1997 | Sutherland et al. ..................... 430/1 |
| 5,737,040 | 4/1998 | Ichikawa et al. ........................ 349/9 |
| 5,745,203 | 4/1998 | Valliath et al. ......................... 349/113 |
| 5,784,181 | 7/1998 | Loiseaux et al. ........................ 359/1 |
| 5,796,499 | 8/1998 | Wenyon ................................. 359/15 |
| 5,801,793 | 9/1998 | Faris et al. .............................. 349/5 |
| 5,825,448 | 10/1998 | Bos et al. ............................... 349/128 |
| 5,875,012 | * 2/1999 | Crawford et al. ...................... 349/74 |
| 5,943,109 | 8/1999 | Kim ....................................... 349/113 |
| 6,020,940 | * 2/2000 | Ishikawa et al. ........................ 349/8 |

FOREIGN PATENT DOCUMENTS

| | | | |
|---|---|---|---|
| WO 97/35223 | 9/1997 | (GB) | .............................. G02B/27/01 |
| WO 98/04650 | 2/1998 | (WO) | .............................. C09K/19/00 |

* cited by examiner

*Primary Examiner*—Jon Henry
(74) *Attorney, Agent, or Firm*—Law Offices of Terry McHugh

(57) ABSTRACT

A projection system and a method of displaying a projected input image on a projection screen of the system utilize one or more reconfigurable holographic optical elements (HOEs) to optically manipulate propagating light in the system. The reconfigurable HOEs may be configured to perform simple optical functions that are commonly associated with traditional optical devices, such as lenses, prisms and mirrors. However, the reconfigurable HOEs may also be configured to perform sophisticated optical manipulations, such as varying the light intensity toward a specific direction and generating virtual (holographic) images. Each reconfigurable HOE includes a hologram that is sandwiched between two electrode layers. The hologram is a holographic photopolymeric film that has been combined with liquid crystal. The hologram has an optical property that changes in response to an applied electrical field. The reconfigurable HOEs may be included in a color filter of the system to selectively diffract tristimulus color lights to a display panel in order to provide a color display of the input image that is projected onto the projection screen. The reconfigurable HOEs may also be included in a projection optics to magnify the projected image on the projection screen and/or redirect the projected image to form a tiled image on the projection screen. Furthermore, the reconfigurable HOEs may be used in the projection screen to vary the light intensity toward specific viewing positions. In one application, the reconfigurable HOEs in the projection screen allow the system to present the display image in a stereoscopic form.

23 Claims, 8 Drawing Sheets

PROJECTION SYSTEMS BASED ON RECONFIGURABLE HOLOGRAPHIC OPTICS

This application claims the benefit of U.S. Provisional Application No. 60/092,259, filed Jul. 10, 1998.

TECHNICAL FIELD

The invention relates generally to projection systems and more particularly to a projection system that utilizes one or more holographic optical elements.

DESCRIPTION OF THE RELATED ART

Projection systems operate to display an image or a sequence of images by projecting the image(s) onto a screen. These systems tend to be designed for multiple viewers and usually require the projection screen to have a large viewing area in order to achieve large fields of view at comfortable viewing distances. The projected images vary in size, depending on the particular projection system. For example, projection systems that are used in theaters are able to display projected images that are extremely large, while projection systems that are used in offices for presentations are typically limited to much smaller projected images.

With reference to FIG. 1, an exemplary prior art projection system 10 is shown. The projection system 10 includes a projector 12 and a projection screen 14. The projector and the screen operate to display an input image generated by projecting the input image onto the screen. The projector 12 is comprised of an image generator 16 and projection optics 18. The image generator 16 contains a light source 20 that provides white illumination light to an input image display panel 22. As an example, the input image display panel 22 may be a reflective liquid crystal display (LCD) panel which is illuminated by the light from the light source. The display panel generates the input image that is to be projected onto the screen.

The image generator 16 also includes a color filter 24 that is positioned between the light source 20 and the display panel 22. The color filter 24 operates to pass only a selected portion of the illumination light, with the selected portion having a particular peak wavelength. The color filter is controllable to sequentially transmit tristimulus color lights, i.e., red, blue and green lights. Typically, the color filter is a rotating disc having three transparent regions. These regions contain pigments to filter the illumination light based on wavelength. The rotation of the disc allows alternating colors to be sequentially transmitted through the disc. When light of a particular peak wavelength impinges upon the display panel 22, an input image corresponding to that particular peak wavelength is displayed on the display panel 22. The input image is then projected toward the projection screen 14 through the projection optics 18. This process is repeated for the other two colors. The sequential projection of the input images that correspond to the tristimulus color lights allows the displayed image on the projection screen to appear to be in color. The size of the displayed image on the projection screen is primarily determined by the projection optics 18 and the distance between the projection optics and the projection screen.

The projection optics 18 includes one or more zooming lenses (not shown) to magnify the projected input image from the image generator 16. These zooming lenses are selectively repositioned within the projection optics to provide specific magnification powers. The projection optics may also include one or more focusing lenses (not shown) to focus the projected image on the projection screen 14. The projection screen may be configured for "reflective viewing," i.e., viewing from the side of the projection screen facing the projector 12, or for "transmissive viewing," i.e., viewing from the side of the projection screen opposite to the projector.

U.S. Pat. No. 5,737,040 to Ichikawa et al. describes a projection system that utilizes a passive hologram array to function as a color filter. The Ichikawa et al. projection system includes a transmissive LCD which receives illumination light from a light source as backlight and which projects an input image in a direction away from the light source. The passive hologram array of the Ichikawa et al. projection system is a single panel that contains a number of micro-holograms. Each micro-hologram operates to disperse incident illumination light based on wavelength, such that each color that is filtered from the illumination light enters a predetermined liquid crystal cell of the LCD. The input image displayed on the LCD is then magnified and projected onto a projection screen. The passive hologram array increases the intensities of the color lights that are transmitted to the LCD from the light source, which consequently increases the brightness of the projected image displayed on the projection screen.

While the prior art projection systems operate well for their intended purposes, what is needed is an efficient projection system having a compact optical configuration and having sophisticated display functions that are enabled by holographic optical elements.

SUMMARY OF THE INVENTION

A projection system and a method of displaying a projected input image on a projection screen of the system utilize one or more reconfigurable holographic optical elements (HOEs) to manipulate propagating light in the system. The reconfigurable HOEs may be designed to perform simple optical functions that are commonly associated with traditional optical devices, such as those performed by lenses, prisms and mirrors. However, the reconfigurable HOEs are also designed to perform sophisticated optical manipulations, such as varying the light intensity with respect to a specific direction.

Each reconfigurable HOE includes a hologram that is sandwiched between two electrode layers. The hologram is a holographic photo-polymeric film that has been combined with liquid crystal. The presence of the liquid crystal allows the hologram to exhibit optical characteristics that are dependent on an applied electrical field. Preferably, the hologram is a Bragg-type hologram, having a high diffraction efficiency. The electrode layers may be made of Indium Tin Oxide (ITO), which typically has a transmission efficiency of greater than 80%.

The reconfigurable HOE has at least two optical operating states, a diffractive state and a passive state. The diffractive properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is generated in the hologram by applying voltage to the electrode layers of the reconfigurable HOE, the operating state of the hologram switches from the diffractive state to the passive state.

In a first embodiment of the invention, the projection system includes a color filter that contains a single reconfigurable HOE stack and includes projection optics having a number of reconfigurable HOE stacks. The term "reconfigurable HOE stack" is herein defined as a set of at least three reconfigurable HOEs that are designed to collectively operate on the propagating tristimulus color lights. Each reconfigurable HOE of the stack in the color filter is holographically configured to diffract a particular tristimulus color light of a polychromatic illumination light when in the diffractive state. In operation, the reconfigurable HOEs of the color filter are sequentially placed in the diffractive state to sequentially diffract the tristimulus color lights to a conventional display panel of the system. The display panel generates an input image that is projected through the projection optics for display on a projection screen of the system.

The reconfigurable HOE stacks of the projection optics are holographically configured to optically manipulate the projected image so that the displayed image on the projection screen is enlarged by a selectable magnification power. Each reconfigurable HOE stack is configured to magnify the projected image by a unique predetermined power. In operation, the reconfigurable HOE stack of the projection optics that has a magnification that corresponds to a desired magnification is selected. The unselected reconfigurable HOE stacks of the projection optics are set to be optically passive. On the other hand, the three reconfigurable HOEs of the selected stack are sequenced between the passive and diffractive states in synchronization with the three reconfigurable HOEs of the color filter to project a color set of projected images to display an enlarged color image on the projection screen.

The projection system in accordance with the first embodiment may be modified without affecting the overall operation of the system. In a first modification of the projection system, the color filter may be replaced with a conventional color filter to sequentially transmit tristimulus color lights to the display panel. In a second modification, instead of substituting the color filter, the reconfigurable HOE stacks in the projection optics may be replaced with conventional lenses to magnify the projected images in a manner that is neutral with respect to wavelength.

In a second embodiment of the invention, the projection system includes projection optics that is able to optically manipulate the projected images to form a tiled image on the projection screen. The tiled image may be comprised of a number of discrete images or may be comprised of image segments that form a composite image. The projection optics in this embodiment also contains a number of reconfigurable HOE stacks. However, these reconfigurable HOE stacks are holographically configured to redirect projected images to designated regions of the projection screen, so as to generate the tiled image on the projection screen. The reconfigurable HOE stacks of the projection optics may also be holographically configured to magnify the projected images by a particular magnification power.

In a third embodiment of the invention, the projection system includes an imaging device, as well as the projection optics of the second embodiment, to display a composite image on the projection screen. In this embodiment, the imaging device operates to track the eye gaze direction of a viewer (e.g., by tracking the position of the head and the eyes of the viewer). The imaging device may be a separate component of the system or may be incorporated into the projection optics. By tracking the eye gaze direction, the system can limit the processing of updating information to provide relevant information for the image segment that corresponds to the viewer's field of view and/or to the image segment that is about to enter the viewer's field of view.

In a fourth embodiment of the invention, the projection screen of the system includes a single reconfigurable HOE stack. When set to the diffractive state, the reconfigurable HOE stack of the projection screen operates to display the projected image on the projection screen. However, when set to the passive state, the reconfigurable HOE stack of the projection screen allows a viewer to see through the projection screen to view an image displayed on a display device, such as a computer monitor. In a more sophisticated configuration, the reconfigurable HOE stack of the projection screen is holographically configured to allow simultaneous viewing of the image on the display device and the projected image displayed on the projection screen.

In a fifth embodiment of the invention, the projection screen of the system includes at least two reconfigurable HOE stacks that have been holographically configured to vary the light intensity of propagating light toward specific viewing positions, when the HOEs are set to the diffractive state. In operation, the reconfigurable HOE stacks of the projection screen are sequentially switched to the diffractive state to advantageously present the same or different images to multiple viewers, depending on their viewing positions. The system may include the projection optics of the third embodiment in order to present the displayed image to the viewers in a composite form. Furthermore, the system may include one or more imaging devices, so that only pertinent image segments of the composite images are updated while tracking the eye gaze directions of the viewers.

In a sixth embodiment of the invention, the projection screen of the system includes at least two reconfigurable HOE stacks that have been holographically configured to vary the light intensity of propagating light toward a particular eye of a viewer, such that the displayed image is visible in a stereoscopic form when the HOEs are set to the diffractive state. The system may include the projection optics of the third embodiment in order to present the displayed image to each eye of the viewer in a composite form. Furthermore, the system may include one or more imaging devices, so that only pertinent image segments of the composite images are updated while tracking the eye gaze direction of the viewer.

An advantage of the present invention is that the reconfigurable HOEs function as very efficient band-pass filters when used in a color filter for color sequential illumination. Furthermore, the reconfigurable HOEs of the color filter provide highly concentrated color lights, which results in a brighter displayed image at the projection screen.

Another advantage is that the reconfigurable HOEs allow the projection optics to perform image tiling, as well as magnification. When used in the projection screen, the reconfigurable HOEs enable multiple viewing positions, where the image on the projection screen is optimally displayed for each viewer. In addition, the reconfigurable HOEs in the projection screen permit the display image to be presented to a viewer in a stereoscopic format. Still another advantage is that the reconfigurable HOEs allow the color filter and the projection optics to have compact optical configurations.

DETAILED DESCRIPTION

Figure 2:
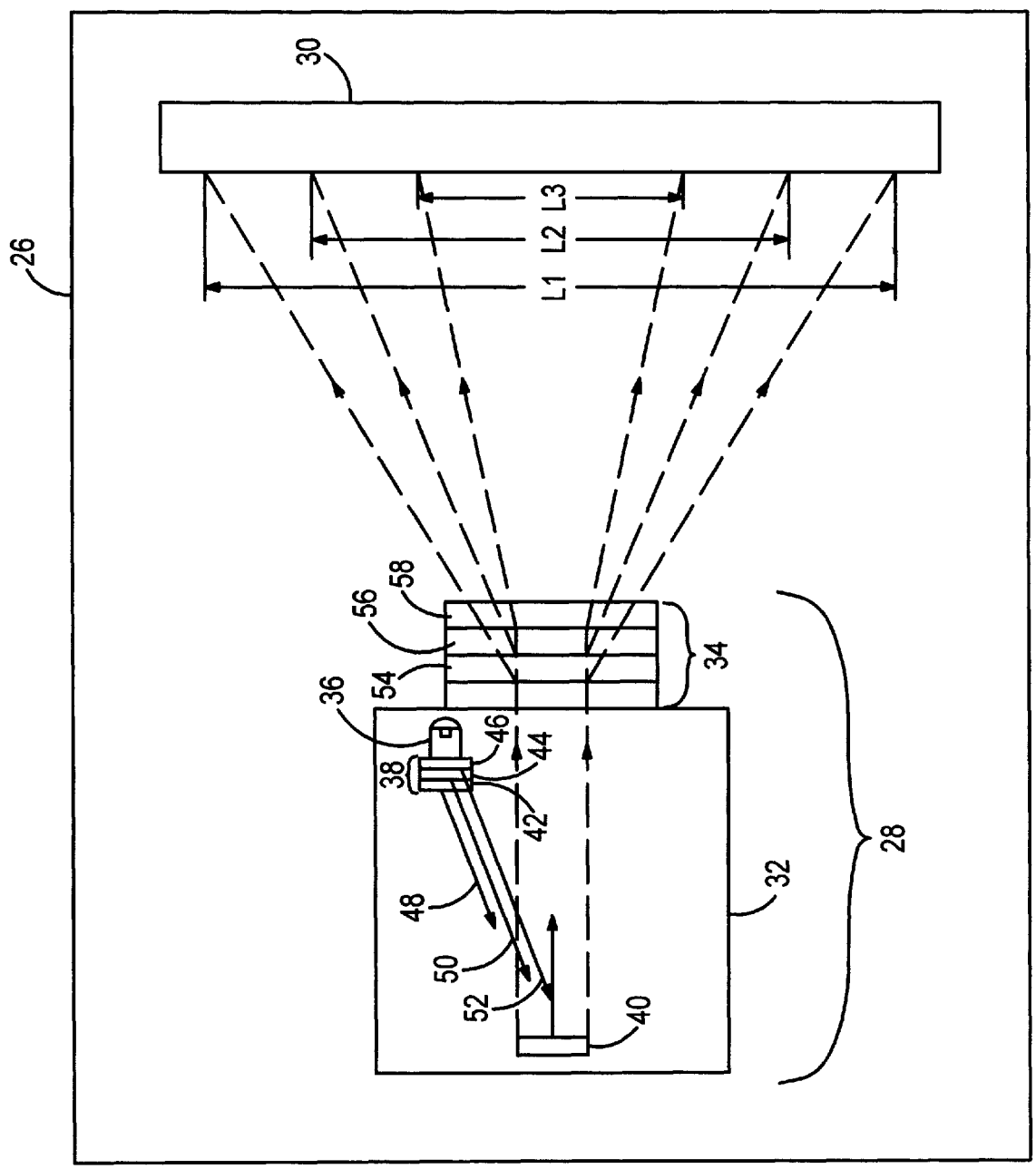
FIG. 2 is a schematic diagram of a projection system in accordance with a first embodiment of the invention.

With reference to FIG. 2, a projection system 26 in accordance with a first embodiment of the invention is shown. The projection system 26 includes a projector 28 and a projection screen 30. Similar to conventional projection systems, the projector and the screen operate to display an input image generated by the projector 28 by projecting the input image onto the screen 30. The screen is a conventional reflectively viewed or transmissively viewed projection screen. However, unlike conventional projection systems, the projector 28 utilizes what will be referred to as "reconfigurable holographic optical elements" (HOEs). These reconfigurable HOEs can perform functions typically associated with traditional optical elements, but also perform more sophisticated optical manipulations.

The reconfigurable HOE includes a hologram that is sandwiched between two electrode layers. The hologram is preferably a Bragg-type hologram, having a high diffraction efficiency. The hologram is a holographic photopolymeric film that has been combined with liquid crystal. As an example, the photopolymeric film may be composed of a polymerizable monomer having dipentaerythritol hydroxypentacrylate, as described in PCT Application No. PCT/US97/12577 of Sutherland et al. The liquid crystal may be suffused into the pores of the photopolymeric film. The holographic fringes could be recorded into the photopolymeric film either prior to or after being combined with the liquid crystal. In the preferred embodiment, the photopolymeric material is combined with the liquid crystal prior to the recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the reconfigurable HOEs.

Recording of the hologram can be accomplished by a traditional optical process in which interference fringes are created by applying beams of light. Alternatively, the interference fringes may be artificially created by using highly accurate laser writing devices or other optical replication techniques. The electrode layers that are adjacent to the hologram are made of a transparent conductive material. As an example, the electrode layers may be made of Indium Tin Oxide (ITO), which usually has a transmission efficiency of greater than 80%. An electrical field is generated within the hologram when a voltage is applied to the layers.

The reconfigurable HOE has at least two operating states, a diffractive state and a passive state. The optical properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is created in the hologram by applying voltage to the electrode layers of the reconfigurable HOE, the state of the hologram switches from the diffractive state to the passive state.

Still referring to FIG. 2, the projector 28 includes an image generator 32 and a projection optics 34. The image generator 32 contains a light source 36, a color filter 38, and a display panel 40. The light source and the display panel may be conventional devices. The display panel 40 may be a miniature reflective LCD having either a nematic or ferroelectric material on a silicon backplane, or may be a micro-mechanical array, such as the digital light processor device manufactured by Texas Instruments Incorporated. The display panel 40 may also be a diffraction-based display device, such as the grating light value developed by Silicon Light Machines, formally Echelle, Inc. The color filter 38 includes three stacked reconfigurable HOEs 42, 44 and 46. For simplification, the holograms and the electrode layers of the reconfigurable HOEs 42–46 are not illustrated. Each of the reconfigurable HOEs 42–46 is holographically designed to diffract only certain color light when that particular reconfigurable HOE is in the diffractive state. The reconfigurable HOE 42 is designed to diffract only red light 48 toward the display panel 40. Similarly, the reconfigurable HOE 44 is designed to diffract only green light 50 toward the display panel 40, while the reconfigurable HOE 46 is designed to diffract only blue light 52 toward the display panel. The specific order of the reconfigurable HOEs 42–46 in the color filter 38 is not critical to the invention.

In operation, the light source 36 emits white illumination light toward the color filter 38. In a timing period equal to or less than the refresh rate of the display panel 40, two of the reconfigurable HOEs 42–46 are activated and the other reconfigurable HOE is deactivated to diffract one of the three tristimulus colors of the illumination light to the display panel 40. The term "deactivate," when used in reference to a reconfigurable HOE, will be defined herein as a condition in which voltage is applied to the reconfigurable HOE to generate an electrical field. The effect of deactivating the reconfigurable HOE is that the reconfigurable HOE will be in the passive state. The term "activate," when used in reference to a reconfigurable HOE, will be defined herein as a condition in which voltage is not applied to the reconfigurable HOE. The effect of activating a reconfigurable HOE is that the reconfigurable HOE will be in the diffractive state.

The other tristimulus color lights are then sequentially diffracted to the display panel 40 by reconfiguring the optical states of the reconfigurable HOEs 42–46. The order in which the tristimulus color lights are diffracted is not critical. As an example, during a first timing period, the reconfigurable HOEs 44 and 46 are deactivated, such that these reconfigurable HOEs 44 and 46 are in the passive state. However, the reconfigurable HOE 42 is activated to the diffractive state. Thus, only the portion of the visible light spectrum corresponding to red light is diffracted to the display panel 40 by the reconfigurable HOE 42. During a second timing period, the reconfigurable HOEs 42 and 46 are deactivated and the reconfigurable HOE 44 is activated, such that only green light is diffracted to the display panel 40. During a third timing period, the reconfigurable HOEs 42 and 44 are deactivated and the reconfigurable HOE 46 is activated, such that only blue light is diffracted to the display panel 40. Consequently, the display panel 40 will be illuminated sequentially by red, green and blue lights, so that the projected input images will appear to be displayed on the projection screen 30 as a composite color image.

The projection optics 34 of the projection system 26 includes three reconfigurable HOE stacks 54, 56 and 58. These reconfigurable HOE stack 54–58 operate to magnify the projected images from the display panel 40. Each reconfigurable HOE of the stacks 54–58 contains recorded interference fringes having diffractive properties to cause the HOE to manipulate light in a manner identical to conventional lenses. Each of the reconfigurable HOE stacks 54–58 is holographically configured to have the capability to magnify a projected image by a predetermined power. The reconfigurable HOE stacks 54–58 are formed such the displayed image on the projection screen 30 has a length or width of L1, L2 or L3, depending on which one of the reconfigurable HOE stacks 54–58 is selected to optically manipulate a projected image from the image generator 32. When only the reconfigurable HOE stack 54 is optically manipulating the projected image, the size of the displayed image on the projection screen 30 is L1. When only the reconfigurable HOE stack 56 is optically manipulating the projected image, the size of the displayed image on the projection screen 30 is L2. When only the reconfigurable HOE stack 58 is optically manipulating the projected image, the size of the displayed image on the projection screen 30 is L3. Therefore, the dimensions of the displayed image on the projection screen 30 can be controlled by selecting one of the reconfigurable HOE stacks 54–58 to optically manipulate the projected image. The number of reconfigurable HOE stacks 54–58 in the projection optics 34 is not critical to the invention. The projection optics 34 can have additional reconfigurable HOE stacks to increase the number of alternative display sizes that are available to the projection system 26.

Although the reconfigurable HOE stacks 54–58 in FIG. 2 are shown as unitary devices, each reconfigurable HOE stack 54–58 contains three reconfigurable HOEs, so as to prevent chromatic aberrations. The three reconfigurable HOEs in each of the reconfigurable HOE stacks 54–58 are similar to the reconfigurable HOEs 42–46 of the color filter 38 in that they are designed to optically operate on an input image that corresponds to a single color light at a time, thereby transmitting that input image to the projection screen 30. When a set of input images that correspond to the tristimulus colors are projected onto the projection screen 30, a composite image formed from the input images appear as a color image. The three reconfigurable HOE assembly of the stacks 54–58 manages the issue of chromatic aberrations.

The operation of the three reconfigurable HOEs in each of the stacks 54–58 is identical to the operation of the reconfigurable HOEs 42, 44 and 46. When a specific magnification is desired, the reconfigurable HOE stack 54–58 that corresponds to that specific magnification is selected. For example, if the display size of L1 is desired, the reconfigurable HOE stack 54 would be selected. The other reconfigurable HOE stacks 56 and 58 would be set to be optically passive to any transmitting light. The reconfigurable HOEs of the stack 54 are then selectively activated and deactivated in sync with the reconfigurable HOEs 42–46 of the color filter 38 to transmit a projected input image that is formed by sequencing the manipulation of the tristimulus colors. For example, when the color filter 38 is configured to diffract only red light, only the reconfigurable HOE of the stack 54 that optically operates on red light is activated to the diffractive state, while the other two reconfigurable HOEs of the stack 54 are deactivated to the passive state. By sequentially magnifying the input images from the display panel 40, a faithful color composite image is displayed on the projection screen 30 at the desired size.

Figure 1:
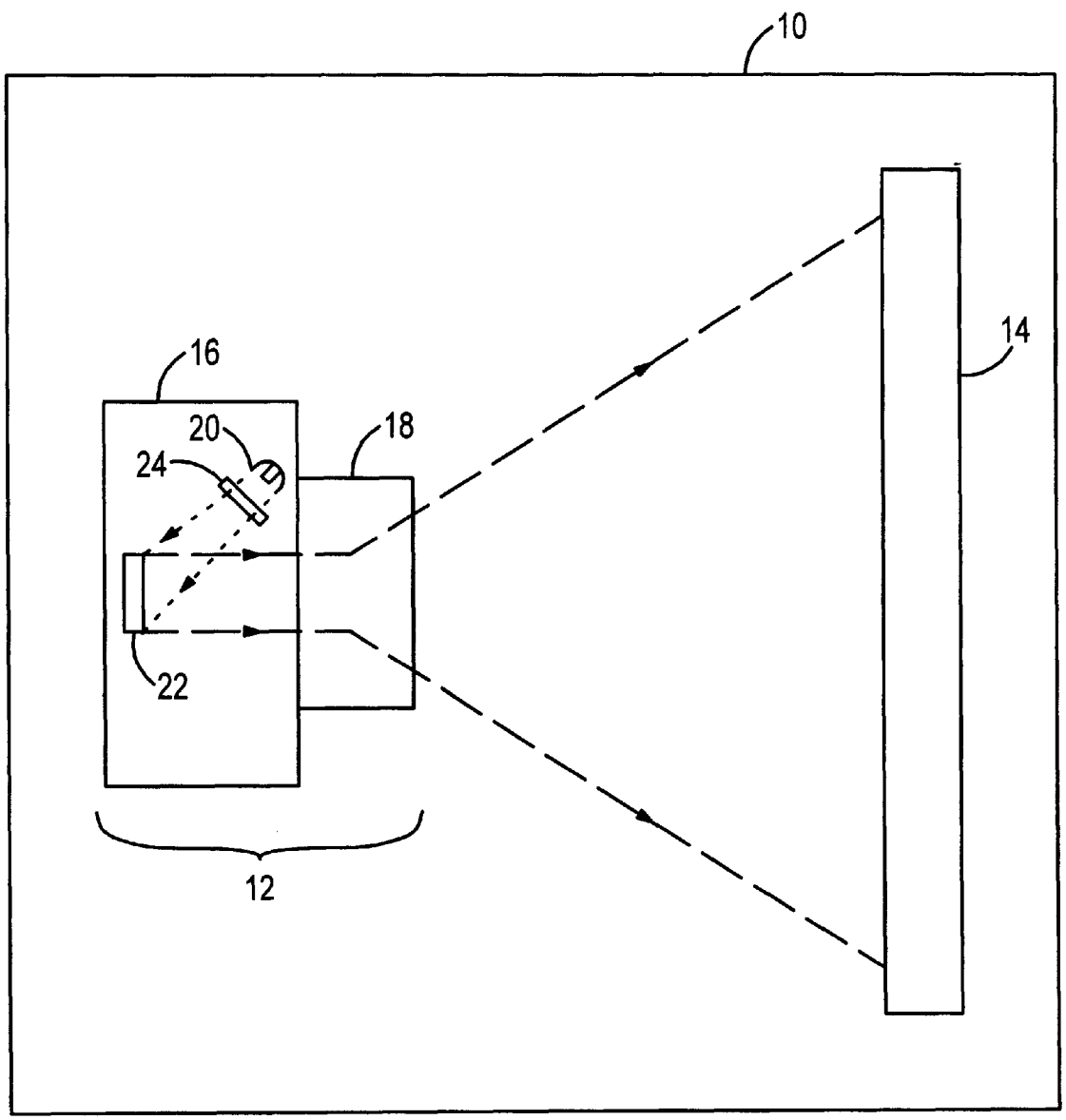
FIG. 1 is a schematic diagram of an exemplary prior art projection system.

The projection system 26 of FIG. 2 may be modified without affecting the overall operation of the system. In a first modification, the image generator 32 may be replaced by a conventional image generator, such as the image generator 16 of the prior art projection system 10 of FIG. 1. The replacement of the image generator 32 will not affect the operation of the projection optics 34. In a second modification, the projection optics 34 may be replaced by conventional projection optics, such as the projection optics 18 of the prior art projection system 10. The replacement of the projection optics 34 will not affect the operation of the image generator 32.

Figure 3:
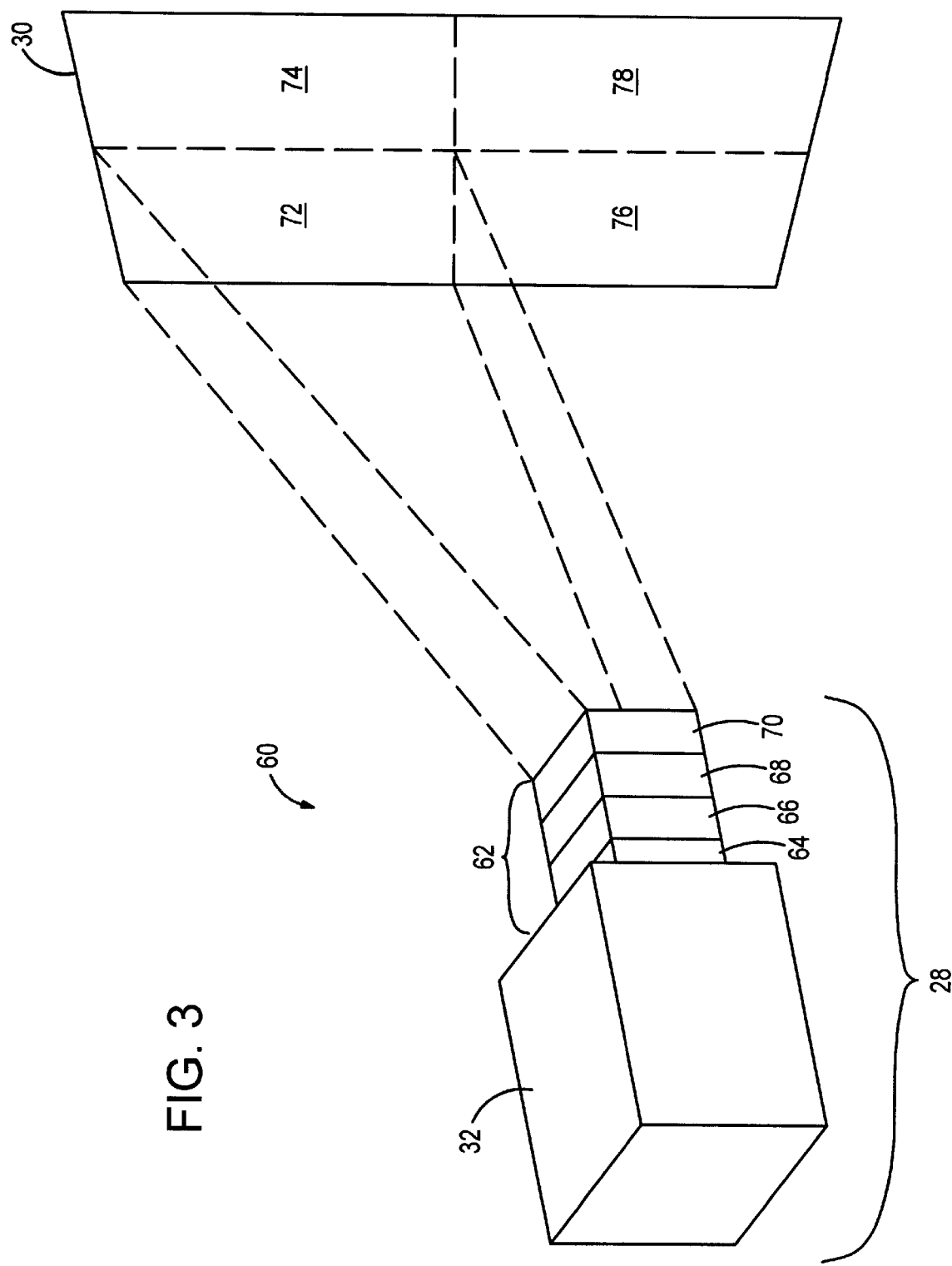
FIG. 3 is a schematic diagram of a projection system in accordance with a second embodiment of the invention.

In FIG. 3, a projection system 60 in accordance with a second embodiment of the invention is shown. The projection system 60 may include the same image generator 16 and the same projection screen 30 of the projection system 26. However, the projection system 60 includes a projection optics 62 which replaces the projection optics 34 of the projection system 26. The projection optics 62 is holographically configured to optically manipulate the projected input images from the image generator 32 to generate multiple tiled images on the projection screen 30. For simplification, the components of the image generator 32 are not shown in FIG. 3.

In this embodiment, the projection optics 62 includes four reconfigurable HOE stacks 64, 66, 68 and 70 that provide a uniform preselected magnification of the projected input images. Each of the reconfigurable HOE stacks 64–70 is holographically configured to project an input image to a predetermined region 72, 74, 76 and 78 on the projection screen 30, when activated. As an example, the reconfigurable HOE stack 70 may be holographically configured to project an input image onto the region 72, while the reconfigurable HOE stacks 64, 66 and 68 are operated to project input images onto the regions 78, 76 and 74, respectively. Similar to the reconfig urable HOE stacks 54–58 of the projection optics 34 of the projection system 26, each of the reconfigurable HOE stacks 60–66 includes three reconfigurable HOEs that are designed to sequentially operate on the three tristimulus colors to form a color image on a particular region 72–78 of the projection screen 30.

In operation, the projection optics 62 sequentially directs a color set of input images to one of the regions 72–78 by allowing only the corresponding reconfigurable HOE stack 64–70 to diffract that color set of input images. For example, in order to display a color image on the region 72 of the projection screen 30, only the reconfigurable HOE stack 70 is enabled to optically manipulate the projected input images. The reconfigurable HOE stacks 64–68 are set to be optically passive to any transmitting light. The three reconfigurable HOEs of the stack 70 are selectively activated and deactivated in synchronization with the reconfigurable HOEs 42–46 of the color filter 38 within the image generator 32 to transmit the projected input image that corresponds to a particular color. For example, when the color filter 38 is configured to diffract red light, only the reconfigurable HOE of the stack 70 that optically operates on red light is activated to the diffractive state, while the other two reconfigurable HOEs of the stack 70 are deactivated to the passive state. The activation of the selected reconfigurable HOE of the stack 70 directs the projected image that corresponds to red light to the region 72 of the projection screen 30. By sequentially transmitting the input images that correspond to different tristimulus colors from the display panel 40 of the image generator 32, a faithful color composite image is projected onto and displayed on the region 72 of the projection screen 30.

A second color image can be displayed on one of the remaining regions 74–78 of the projection screen 30 by selecting a corresponding reconfigurable HOE stack 64–68 to operate on the next color set of input images that are generated on the display panel 40 of the image generator 32. For example, the second color image can be displayed on the region 78 by disenabling the stack 70 to be optically passive and enabling the reconfigurable HOEs of the stack 64 to transmit input images of the second color image to the region 78. The first color image displayed on the region 72 and the second color image subsequently displayed on the region 78 will appear to be simultaneously displayed, if the display rate is sufficiently fast. With a faster display rate, four different color images can be "simultaneously" displayed on all four regions 72–78 of the projection screen 30.

A color image displayed on one of the regions 72–78 may be a complete image, such that four discrete images can be displayed on the projection screen 30. In an alternative configuration, the image displayed on one of the regions 72–78 is only an image segment of a single composite color image. The four color images that are sequentially displayed on the regions 72–78 of the projection screen 30 form the single composite image. In this configuration, for a given size image, the overall resolution of the displayed composite image can be significantly higher than if the image were projected as a single image.

In a more complex embodiment, the projection optics 62 includes additional reconfigurable HOE stacks to display partial images on smaller regions of the projection screen. As an example, the projection optics 62 may include a total of sixteen reconfigurable HOE stacks for displaying a single composite image comprised of sixteen color image segments in a 4×4 configuration.

Figure 4:
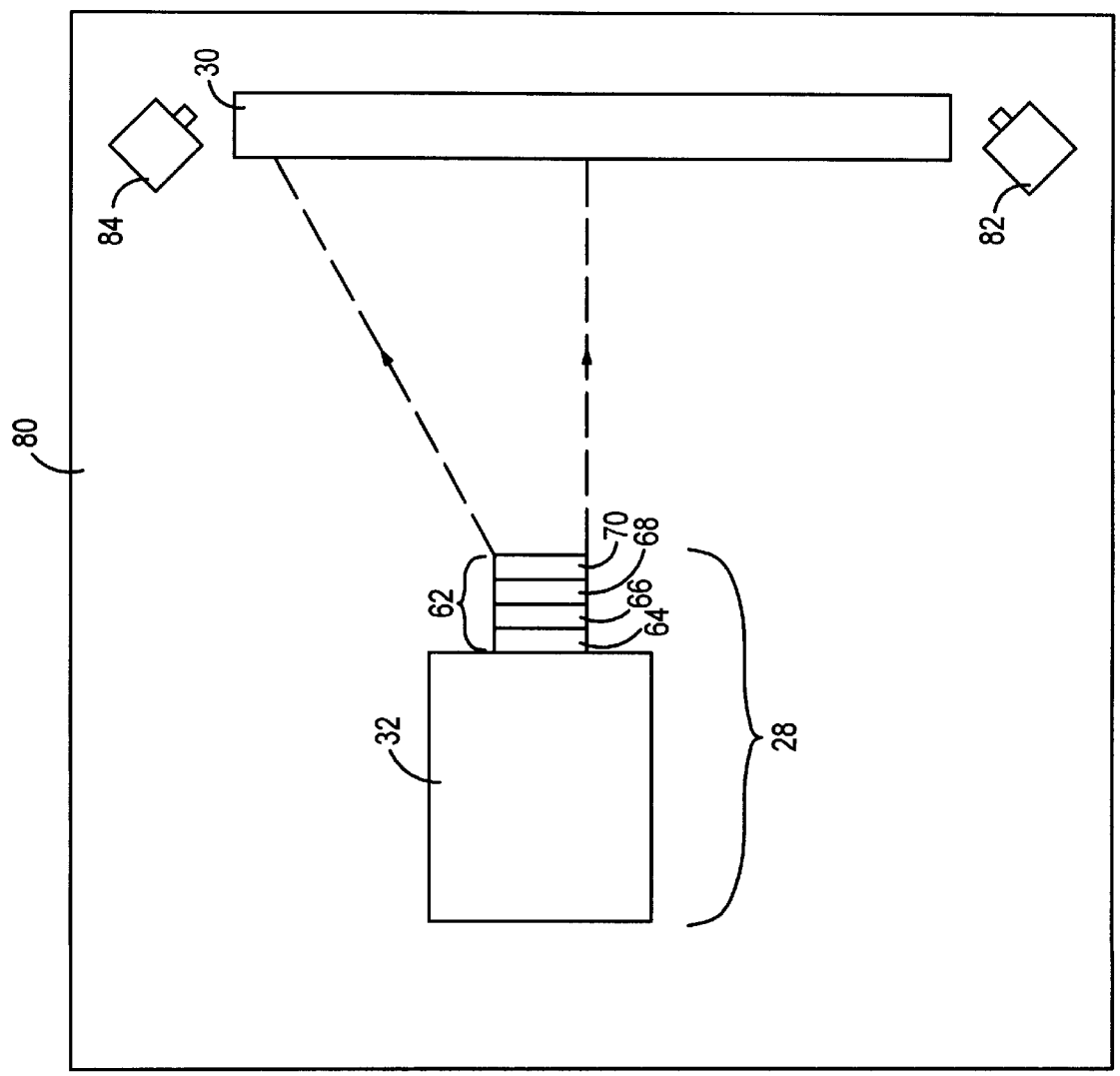
FIG. 4 is a schematic diagram of a projection system in accordance with a third embodiment of the invention.

Turning to FIG. 4, a projection system 80 in accordance with a third embodiment of the invention is shown. The same reference numerals of FIGS. 2 and 3 will be used for the same components illustrated in FIG. 4. The projection system 80 includes all the components of the projection system 60 of FIG. 3. However, the projection system 80 includes two imaging devices 82 and 84. In general, the projection system 80 operates similarly to the projection system 60 to display a composite image on the projection screen 30. As stated above, the composite image is formed by sequentially displaying segments of the composite image on the regions 72–78 of the projection screen. To display a continuously changing composite image on the projection screen 30, each image segment of the composite image must be updated and displayed. Such a process can be computationally intensive with respect to image processing. The projection system 80 operates to alleviate some of this processing burden by implementing a moving viewable area of interest (AOI). The term "area of interest" is defined herein as a field of view region centered on a position of the projection screen 30 targeted by a viewer 86. The AOI can be determined by the eye gaze direction of the viewer 86. By tracking the eye gaze direction of the viewer 86, only image segments that are currently within the AOI or about to be within the AOI are updated.

The imaging devices 82 and 84 operate to image the head or the eyes of the viewer 86 to establish the viewer's eye gaze direction. The imaging devices 82 and 84 can be separate components of the projection system 80, as shown in FIG. 4. In an alternative configuration, the imaging devices may be incorporated into the projection optics 62, as described in U.S. Provisional Application No. 60/094,522, entitled "Holographic Integrated Display and Imaging System," filed Jul. 8, 1998. The imaging devices 82 and 84 can utilize various known imaging techniques to capture the position of the head or the eyes of the viewer 86 for determining the viewer's eye gaze direction. For example, each of the imaging devices 82 and 84 may include a light-emitting element to radiate imaging light, such as infra-red light, to the head or the eyes of the viewer 86 and a light sensor to receive the back-scattered light for imaging. A known image processing technique can then be utilized to determine the viewer's eye gaze direction.

The determination of the viewer's eye gaze direction is utilized to identify which region or regions 72–78 of the projection screen 30 require recurring updates by identifying the fixated viewing point of the viewer 86. The remaining regions of the projection screen 30 are displayed with the previous image segments. The resolution of these remaining image segments may be lowered to further decrease the required signal processing. Using a suitable algorithm to predict the trajectory of a moving viewing point, the region 72–78 that will be entered by the gaze of the viewer 86 can be updated just prior to entry. In order to avoid any ambiguities at the adjacent boundaries of the regions 72–78, the image segments displayed on the regions 72–78 should overlap into portions of the adjoining regions.

Figure 5:
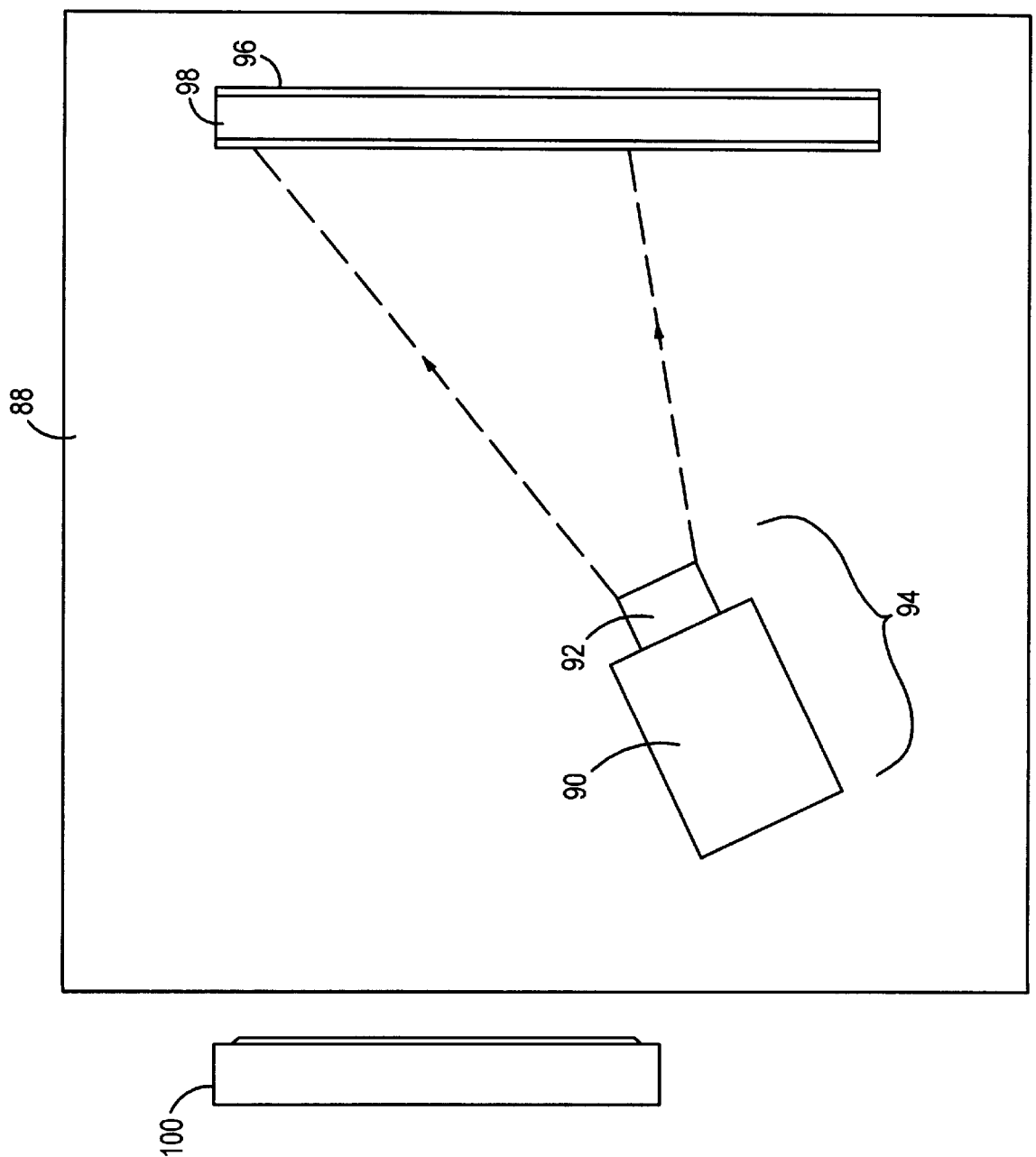
FIG. 5 is a schematic diagram of a projection system in accordance with a fourth embodiment of the invention.

Turning to FIG. 5, a projection system 88 in accordance with a fourth embodiment of the invention is shown. The projection system 88 includes an image generator 90 and a projection optics 92 that define a projector 94. The image generator 90 and the projection optics 92 may be conventional devices. However, the image generator 90 may be identical to the image generator 32 of the projection system 26 and the projection optics 92 may be identical to the projection optics 34 of the projection system 26 or the projection optics 62 of the projection system 60. The projection system 88 also includes a transmissively viewed projection screen 96. The projection screen 96 includes a single reconfigurable HOE stack 98 that can display a projected image from the projector 94, when enabled to optically operate on the projected image. The reconfigurable HOE stack 98 includes three reconfigurable HOEs to display the projected image in color.

The projection system 88 is positioned between a display device 100 and a viewer 86. The display device 100 may be a computer monitor or other conventional display device. The projection system 88 operates to allow the viewer 86 to see an image on the display device 100 or the projected image presented on the projection screen 96. When the image on the display device 100 is to be viewed exclusively, the projector 94 will cease generating the image to the projection screen 96. In addition, the reconfigurable HOEs of the stack 98 in the projection screen 96 are set to a passive state to allow light to be passively transmitted through the projection screen in order for the viewer to see the image on the display device 100. This see-through capacity of the projection screen allows the system to be used as a conventional heads-up display, where computer generated imagery, i.e., the image on the display device 100, is superimposed on the ambient scenery. When the projected image is to be viewed exclusively, the reconfigurable HOEs are enabled to optically operate on the projected image from the projector 94 to display the projected image on the projection screen 96. Preferably, the display device 100 is deactivated to prevent optical interference within the projection screen 96 by lights from the display device 100 and the projector 94.

In a more sophisticated arrangement, the reconfigurable HOEs within the projection screen 96 are holographically configured to allow simultaneous viewing of the image on the display device 100 and the projected image from the projector 94. The holographic configuration of the reconfigurable HOEs of the stack 98 within the projection screen 96 allows the light from the image on the display device 100 to be unaltered by the reconfigurable HOEs, even when one of the reconfigurable HOEs is in the diffractive state. However, the light from the projector 94 is optically manipulated by the diffracting reconfigurable HOE to display the projected image on the projection screen 96. Preferably, the intensity of the projected image displayed on the projection screen 96 is adjusted with the background scene, i.e., the image on the display device 100, to ensure sufficient contrast between the two images. The simultaneous viewing feature of the projection system 88 has many practical advantages. For example, a copy-typing task could be carried out in greater visual comfort by having the source material displayed as a projected image on the projection screen 96 and the computer text displayed on the display device 100, thereby allowing an operator to view the source material and the computer text at the same focal plane.

Figure 6:
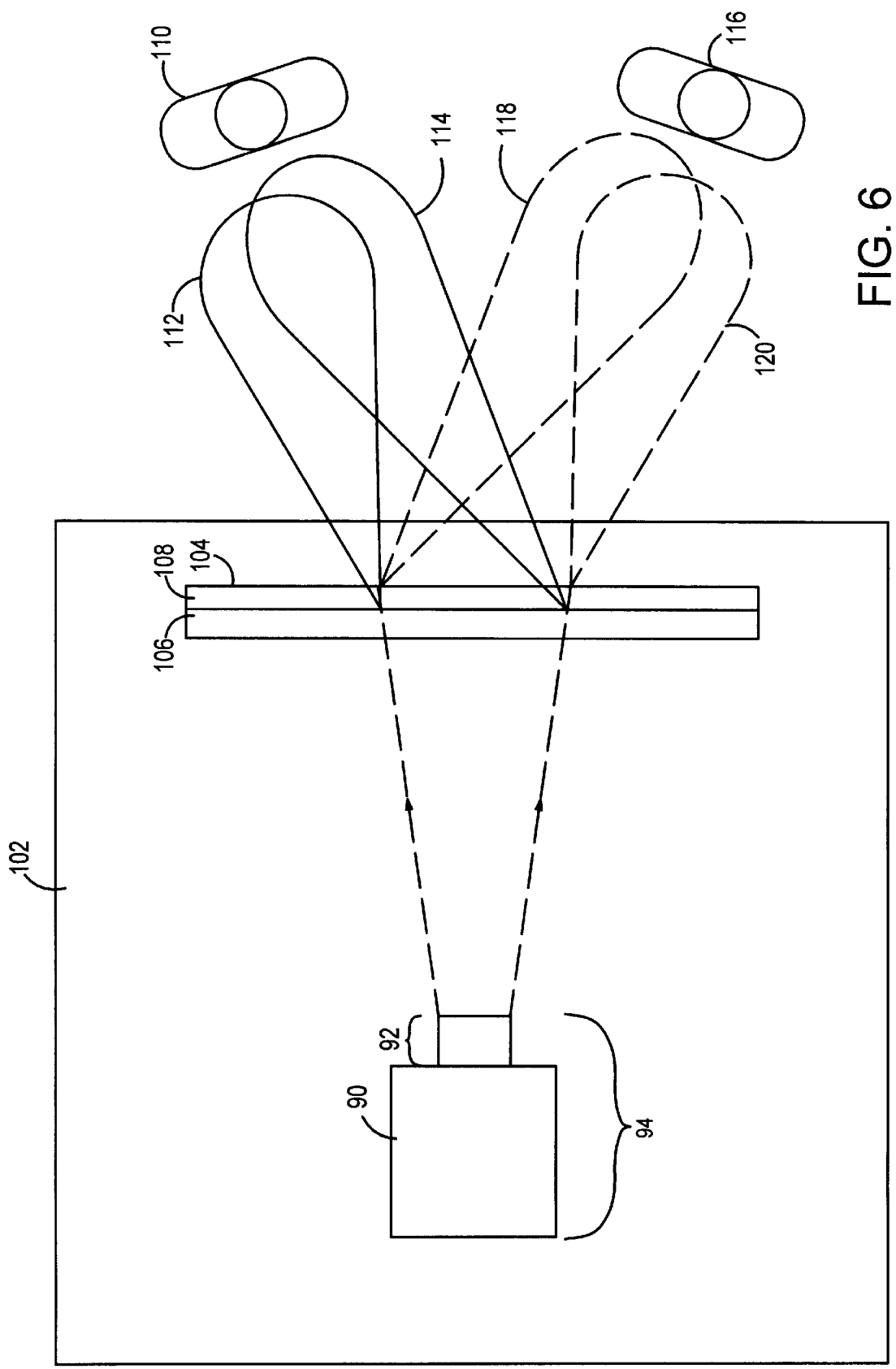
FIG. 6 is a schematic diagram of a projection system in accordance with a fifth embodiment of the invention.

In FIG. 6, a projection system 102 in accordance with a fifth embodiment of the invention is shown. The projection system 102 includes the projector 94 and a projection screen 104. The projector 94 is composed of the image generator 90 and the projection optics 92. The image generator 90 and the projection optics 92 may be conventional devices. However, the image generator 90 may be identical to the image generator 32 of the projection system 26 and the projection optics 92 may be identical to the projection optics 34 of the projection system 26. The projection screen 104 includes at least two reconfigurable HOE stacks 106 and 108. Each of the reconfigurable HOE stacks 106 and 108 in the projection screen 104 includes three reconfigurable HOEs to display an image in color.

The reconfigurable HOE stacks 106 and 108 of the projection screen 104 are holographically configured to angularly vary the light intensity of propagating light toward a specific viewing position, when enabled to optically manipulate propagating light. The reconfigurable HOE stack 106 is designed to increase the intensity of light toward the location of a viewer 110, as shown by polar diagrams 112 and 114. The reconfigurable HOE stack 108 is designed to increase the intensity of light toward the location of a viewer 116, as shown by polar diagrams 118 and 120. The increase in light intensity creates a brighter displayed image for the viewers 110 and 116.

In operation, the reconfigurable HOE stacks 106 and 108 optically operate on a color set of projected images from the projector 94 in an alternating fashion. When the reconfigurable HOE stack 106 is operating on a color set of projected images, the reconfigurable HOEs of the stack 106 are sequentially activated to optically manipulate the projected images, such that a color image is presented to the viewer 110. In the next sequence, the reconfigurable HOEs of the stack 108 are sequentially activated to optically manipulate the next color set of projected images, such that a color image is presented to the viewer 116. The alternating operations of the reconfigurable HOE stacks 106 and 108 allow both viewers 110 and 116 to see a brighter color image.

In one application, the same color image is presented to the viewers 110 and 116. In a more complex application, different color images are presented to the viewers 110 and 116. This is accomplished by generating a color set of projected images for the first color image when one of the reconfigurable HOE stacks 106 and 108 is operating and then generating a different color set of projected images for the second color image when the other reconfigurable HOE stack is operating.

The projection screen 104 may include additional reconfigurable HOE stacks that are designed to increase the intensity of light toward different locations. By increasing the number of reconfigurable HOE stacks in the projection screen 104, more viewers can optimally view the images displayed on the projection screen 104. The number of reconfigurable HOE stacks in the projection screen 104 is not critical to the invention.

In a more complex arrangement, the projection optics 92 is replaced by projection optics 62 of the projection systems 60 and 80, such that the image is displayed on the projection screen 104 as image segments that form a composite image. Using the projection optics 62 in conjunction with the projection screen 104, different composite images can be present to the viewers 110 and 116. Furthermore, the imaging devices 82 and 84 of the projection system 80 in FIG. 4 may be incorporated into the projection system 102 to track the eye gaze directions of the viewers 110 and 116.

The incorporation of the imaging devices 82 and 84 will allow the projection system 102 to update only the relevant image segments that are currently or about to be in the field of view of the viewers. The operation of such projection system will be virtually identical to the projection system 80. The only difference is that the entire operation of the projection optics 62 must be repeated for each reconfigurable HOE stack 106 and 108 of the projection screen 104 in order to optimally present the displayed composite images to the viewers 110 and 116.

Figure 7:
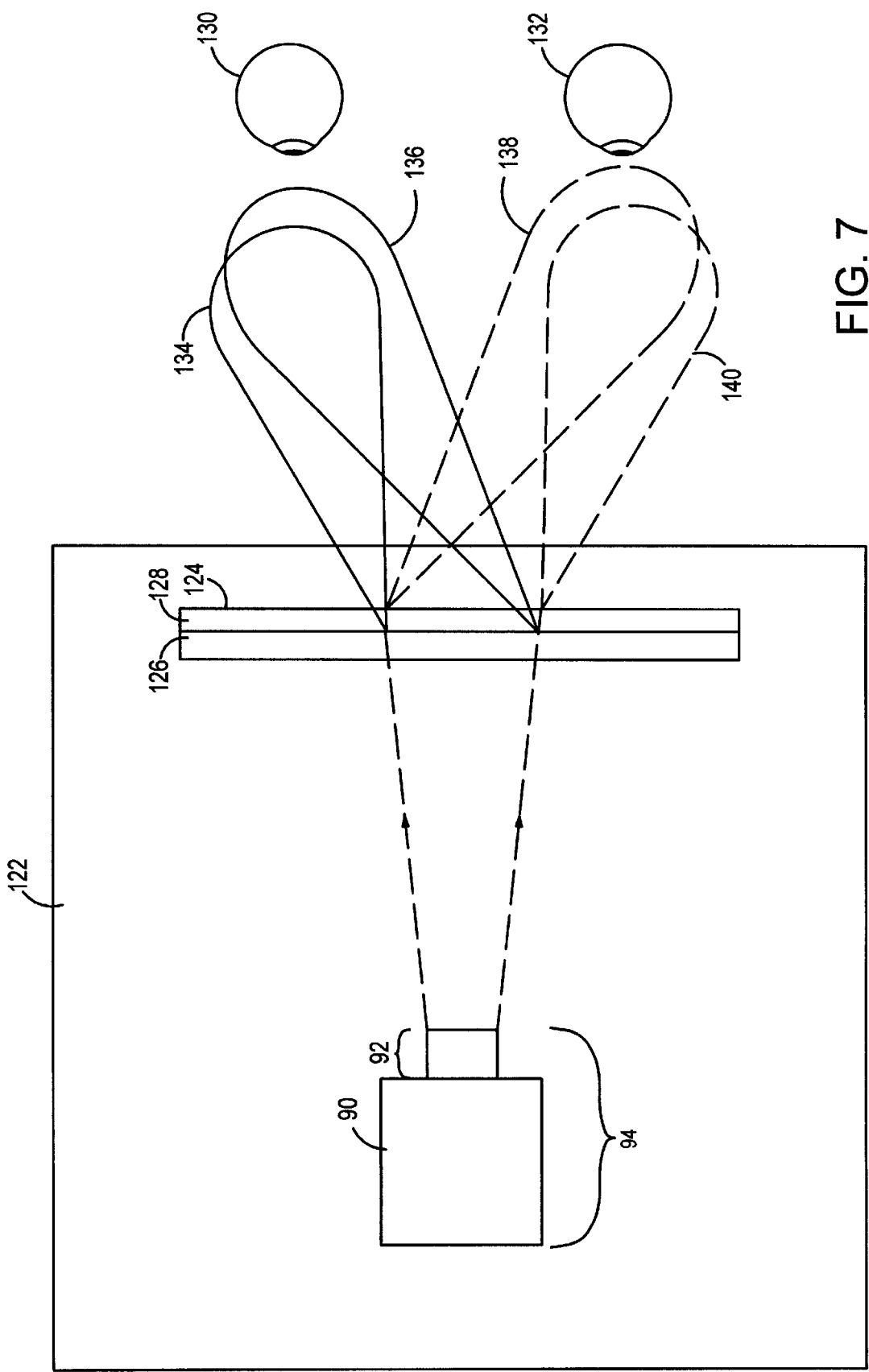
FIG. 7 is a schematic diagram of a projection system in accordance with a sixth embodiment of the invention.

Turning to FIG. 7, a projection system 122 in accordance with a sixth embodiment of the invention is shown. The projection system 122 includes the projector 94 and a projection screen 124. The projector 94 is composed of the image generator 90 and the projection optics 92. The image generator 90 and the projection optics 92 may be conventional devices. However, the image generator 90 may be identical to the image generator 32 of the projection system 26 and the projection optics 92 may be identical to the projection optics 34 of the projection system 26. The projection screen 124 includes two reconfigurable HOE stacks 126 and 128. Each of the reconfigurable HOE stacks 126 and 128 includes three reconfigurable HOEs to display an image in color.

Similar to the reconfigurable HOE stacks 106 and 108 of the projection system 102 in FIG. 6, the reconfigurable HOE stacks 126 and 128 are holographically configured to angularly vary the light intensity of propagating light toward a specific viewing position, when enabled to optically manipulate propagating light. However, the reconfigurable HOE stacks 126 and 128 are designed to increase the intensity of light toward the eyes 130 and 132 of a single viewer, instead of multiple viewers. The reconfigurable HOE stack 126 is designed to increase the intensity of light toward the right eye 130, as shown by polar diagrams 134 and 136, while the reconfigurable HOE stack 128 is designed to increase the intensity of light toward the left eye 132, as shown by polar diagrams 138 and 140. The increase in light intensity toward each eye of the viewer can create an auto-stereoscopic display for the viewer.

In operation, the reconfigurable HOE stacks 126 and 128 optically operate on projected images from the projector 94 in an alternating fashion. When the reconfigurable HOE stack 126 is operating on a first color set of projected images, the reconfigurable HOEs of the stack 126 are sequentially activated to optically manipulate the projected images from the projector 94, such that a first color image is presented to the right eye 130. In the next sequence, the reconfigurable HOEs of the stack 128 are sequentially activated to optically manipulate a color set of projected images from the projector 94, such that a second color image is presented to the left eye 132. The first and second color images are images that depict a single scene from different points of view, i.e., the left and right eyes of a viewer. The first and second projected images present an illusion that the scene being viewed is three-dimensional.

The projection screen 124 may be modified to accommodate additional viewers. For each additional viewer, the projection screen 124 may be modified by including a pair of additional reconfigurable HOE stacks. Each new stack of the pair would be dedicated to one of the eyes of the additional viewer for auto-stereoscopic display. For multiple viewers, the reconfigurable HOE stacks of the projection screen 124 are individually activated in a sequential manner to present a stereoscopic image directed to the eyes of the viewers.

In a more complex arrangement, the projection optics 92 is replaced by projection optics 62 of the projection system 60 and 80, such that the each color image displayed to an eye of a viewer is an image segment of a composite image. Using the projection optics 62 in conjunction with the projection screen 124, different composite images can be presented to the right and left eyes 130 and 132. Furthermore, the imaging devices 82 and 84 may be incorporated into the projection system 122 to track the eye gaze directions of the eyes 130 and 132. The incorporation of the imaging devices 82 and 84 will allow the projection system 122 to update only the relevant image segments that the viewer is currently or is about to view in his/her field of view. The operation of such a projection system will be virtually identical to the projection system 80. The only difference is that the entire operation of the projection optics 62 must be repeated for each reconfigurable HOE stack 126 and 128 of the projection screen 104 in order to stereoscopically present the displayed composite image to the eyes 130 and 132.

Figure 8:
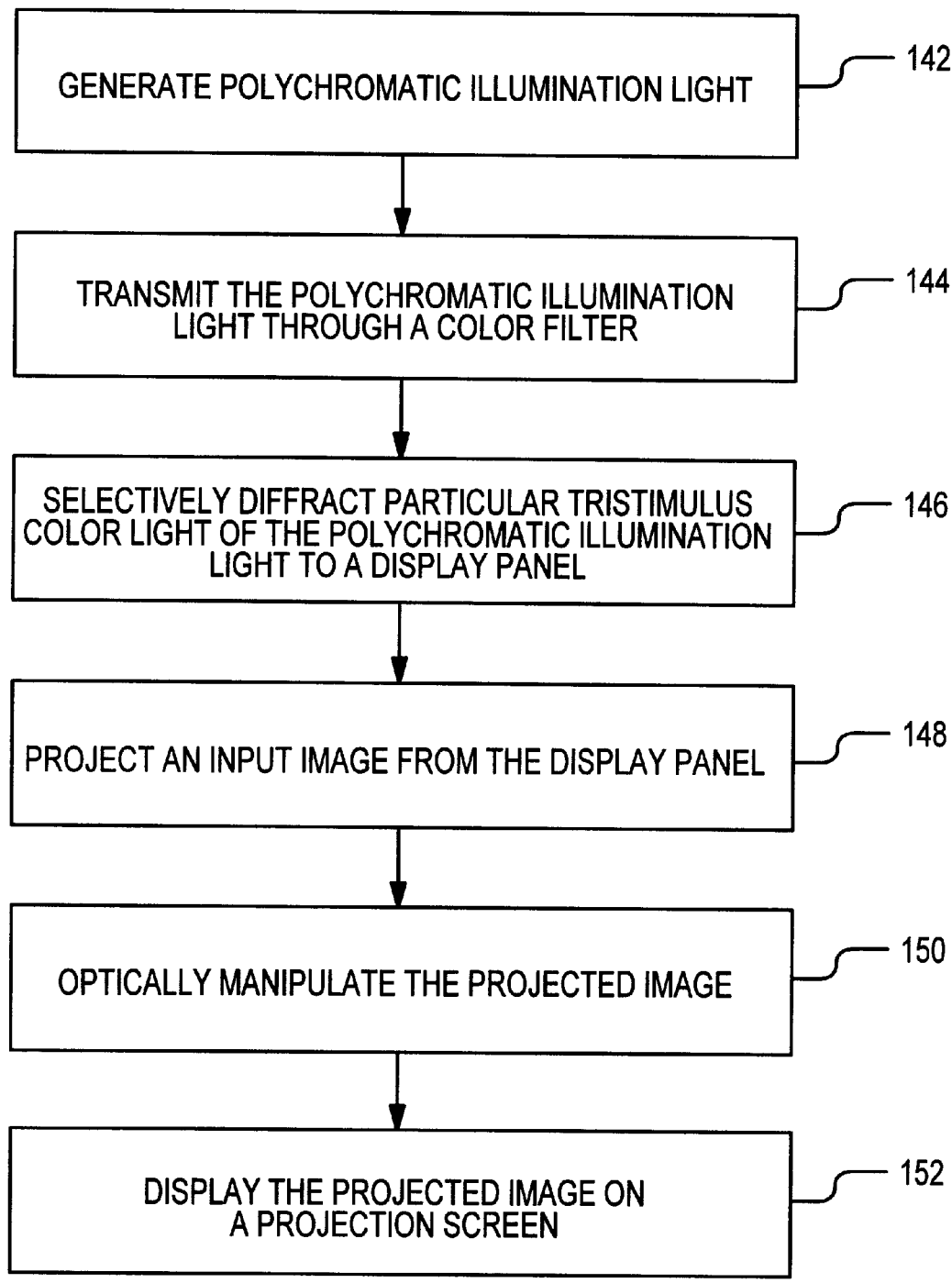
FIG. 8 is a flow diagram of a method of displaying a projected image on a projection screen of a projection system in accordance with the invention.

A method of displaying a projected image on a projection screen of a projection system will be described with reference to FIG. 8. At step 142, polychromatic illumination light is generated by a light source of the system. Next, at step 144, the polychromatic illumination light is transmitted through a color filter. The color filter includes a number of reconfigurable HOEs. Preferably, the color filter includes three reconfigurable HOEs that have been holographically configured such that each reconfigurable HOE is able to optically manipulate one of the tristimulus colors of the polychromatic illumination light. At step 146, a particular color light of the polychromatic illumination light is selectively diffracted to a display panel of the projection system by an activated reconfigurable HOE of the color filter. An input image that will be displayed on the projection screen is generated by the display panel.

At step 148, the input image is projected from the display panel toward the projection screen in response to the reception of the diffracted color light from the color filter. Next, at step 150, the projected image is optically manipulated by a projection optics of the projection system. The projection optics includes a number of reconfigurable HOEs. In one embodiment, the reconfigurable HOEs of the projection optics are holographically configured such that each reconfigurable HOE of the projection optics is able to magnify the projected image by a predetermined power. The magnification of the projected image is controlled by activating the appropriate reconfigurable HOE of the projection optics. In another embodiment, the reconfigurable HOEs of the projection optics are holographically configured such that each reconfigurable HOE is able to redirect the projected image toward a preselected direction. The redirecting of the projected image allows the projection system to display a composite image that is formed by a number of the projected images, wherein each projected image is an image segment of the composite image. At step 152, the projected image is displayed on the projection screen for viewing.

What is claimed is:

1. A color filtering device comprising:

holographic means positioned to intercept propagating polychromatic light for selectively diffracting particular color lights of said polychromatic light to a preselected destination, said color lights being associated with different wavelength ranges within the visible light spectrum, said holographic means including at least two reconfigurable holographic optical elements, each of said reconfigurable holographic optical elements having holographically recorded interference fringes to optically manipulate said particular color lights, each of said reconfigurable holographic optical elements being reconfigurable with respect to a diffractive characteristic in response to an applied electrical field, said reconfigurable holographic optical elements being positioned and oriented such that said polychromatic light is transmitted through more than one of said reconfigurable holographic optical elements.

2. The device of claim 1 wherein said holographic means includes a plurality of reconfigurable holographic optical elements, each of said reconfigurable holographic optical elements including a hologram that is specific to diffracting one of said particular color lights of said polychromatic light when said hologram is in a diffraction state, each said hologram being transmissive of said color lights when said hologram is in a passive state, said diffractive and passive states being dependent upon presence of said applied electrical field.

3. The device of claim 2 wherein said plurality of said reconfigurable holographic optical elements includes a red hologram that is configured to diffract red color light of said polychromatic light, a green hologram that is configured to diffract green color light of said polychromatic light, and a blue hologram that is configured to diffract blue color light of said polychromatic light.

4. The device of claim 2 wherein said hologram of each of said reconfigurable holographic optical elements includes liquid crystal and photopolymeric material.

5. A projection system comprising:

light-generating means for emitting light in a predetermined direction;

image-forming means positioned to receive said light from said light-generating means for optically projecting an input image in response to reception of said light;

display means in optical communication with said image-forming means for visually displaying said input image projected from said image-forming means; and holographic means positioned between said light-generating means and said image-forming means for chromatically filtering and time-selectively diffracting particular color lights of said light emitted from said light-generating means, said holographic means having holographically recorded interference fringes that at least partially define an optical characteristic of said holographic means, said holographic means being reconfigurable with respect to said optical characteristic by presence of an applied electrical field.

6. The system of claim 5 wherein said holographic means includes three reconfigurable holographic optical elements that are placed in series to optically operate on said light, each of said three reconfigurable holographic optical elements including a hologram that is configured to diffract only a portion of said light having a peak wavelength within one of tristimulus color wavelength ranges of the visible light spectrum when said hologram is in a diffractive state, said three reconfigurable holographic optical elements being dedicated to different wavelength ranges of said tristimulus color wavelength ranges.

7. The system of claim 6 wherein said hologram of each of said three reconfigurable holographic optical elements includes liquid crystal and photopolymeric material.

8. The system of claim 6 wherein said hologram of each of said three reconfigurable holographic optical elements is positioned between two electrode layers that generate said applied electrical field in response to an excitation signal.

9. The system of claim 5 further comprising a projection optics operatively coupled to said image-forming means to transmit said input image to said display means, said projection optics including at least one reconfigurable holographic optical element to optically manipulate said input image, said reconfigurable holographic optical element having an optically diffractive characteristic that is responsive to said applied electrical field.

10. The system of claim 9 wherein said reconfigurable holographic optical element of said projection optics is holographically configured to have a first magnification power substantially different than one, such that said input image is displayed on said display means in a modified size when said reconfigurable holographic optical element is in a diffractive state.

11. The system of claim 10 wherein said projection optics further includes a second reconfigurable holographic optical element, said second reconfigurable holographic optical element being holographically configured to have a second magnification power different than said first magnification power, such that said input image is displayed on said display means in a different size than said modified size when said second reconfigurable holographic optical element is in said diffractive state.

12. The system of claim 9 wherein said reconfigurable holographic optical element of said projection optics is one of a plurality of reconfigurable holographic optical elements, each of said reconfigurable holographic optical elements being holographically configured such that said input image is redirected to a unique selected region of said display means when a corresponding reconfigurable holographic optical element is in a diffractive state, said input image being an image segment of a composite image that is displayed on said display means.

13. The system of claim 12 further comprising a viewer imaging means for tracking an eye gaze direction of a viewer, said viewer imaging means being operatively coupled to said image-forming means to identify a particular image segment of said composite image to receive image update information, said particular image segment being identified based on said tracking of said eye gaze direction.

14. The system of claim 5 wherein said display means includes a reconfigurable holographic optical element having an optically diffractive characteristic that is responsive to said applied electrical field, said reconfigurable holographic optical element being holographically configured to display said input image only when said reconfigurable holographic optical element is in a diffractive state, said display means being transparent when said reconfigurable holographic optical element is in a passive state.

15. The system of claim 5 wherein said display means includes a plurality of reconfigurable holographic optical elements, said reconfigurable holographic optical elements having an optically diffractive characteristic that is responsive to said applied electrical field, each of said reconfigurable holographic optical elements being holographically configured to vary an angular light intensity of said input image being displayed on said display means to a specific direction from said display means when in a diffractive state.

16. A method of displaying a projected image on a projection screen of a projection system comprising steps of:
generating polychromatic illumination light;
transmitting said polychromatic illumination light through a plurality of first reconfigurable holographic optical elements, each of said first reconfigurable holographic optical elements having a diffractive characteristic that is controllable by an applied electrical field;
selectively diffracting particular color light of said polychromatic illumination light to a display component of said projection system by activating at least one of said first reconfigurable holographic optical elements to a diffractive state;
projecting an input image generated by said display component to said projection screen in response to a reception of said particular color light; and
displaying said input image on said projection screen.

17. The method of claim 16 wherein said step of selectively diffracting said particular color light of said polychromatic illumination light is a step of selectively diffracting one of tristimulus color lights of said polychromatic illumination light.

18. The method of claim 17 further comprising a step of repeating said step of selectively diffracting one of said tristimulus color lights of said polychromatic illumination light until each of said tristimulus color lights has been sequentially diffracted.

19. The method of claim 16 further comprising a step of optically manipulating said input image that is being projected from said display component by transmitting said input image through a second reconfigurable holographic optical element within a projection optics of said projection system such that said input image is displayed on said projection screen in a modified size, said second reconfigurable holographic optical element having an optical characteristic that is responsive to said applied electrical field.

20. The method of claim 16 further comprising a step of redirecting said input image to a preselected region of said projection screen by transmitting said input image through a second reconfigurable holographic optical element within a projection optics of said projection system, said second reconfigurable holographic optical element having an optical characteristic that is responsive to said applied electrical field, said input image being an image segment of a composite image that is to be displayed on said projection screen.

21. The method of claim 20 further comprising steps of:
tracking an eye gaze direction of a viewer by imaging a pertinent portion of said viewer; and
updating a particular image segment of said composite image displayed on said projection screen in response to said tracking of said eye gaze direction.

22. The method of claim 16 wherein said step of displaying said input image on said projection screen includes activating a second reconfigurable holographic optical element within said projection screen such that said second reconfigurable holographic optical element is in a diffractive state, said projection screen being transparent when said second reconfigurable holographic optical element is deactivated to a passive state.

23. The method of claim 16 further comprising a step of varying angular light intensity of said input image being displayed on said projection screen by transmitting said input image through a second reconfigurable holographic optical element within said projection screen, said second reconfigurable holographic optical element having an optical characteristic that is responsive to said applied electrical field to effectuate said variation of said angular light intensity.

\* \* \* \* \*